US005562313A

United States Patent [19]
Piniaev et al.

[11] Patent Number: 5,562,313
[45] Date of Patent: Oct. 8, 1996

[54] THREADLESS CONNECTOR FOR ELECTRICAL CONDUITS

[75] Inventors: Alexey Piniaev; Simon Litvin; Alexander Ljubomirsky; Alexey Zakharov; Alexey Mishin, all of St. Petersburg, Russian Federation; Michael Valdman, Philadelphia, Pa.; Michael Katz, St. Island, N.Y.

[73] Assignee: Invention Machine Corporation, Cambridge, Mass.

[21] Appl. No.: 344,486

[22] Filed: Nov. 22, 1994

[30] Foreign Application Priority Data

Nov. 26, 1993 [RU] Russian Federation ............. 93053234

[51] Int. Cl.⁶ .................................................. F16L 17/04
[52] U.S. Cl. ......................... 285/373; 285/419; 285/420
[58] Field of Search ................................ 285/373, 104, 285/419, 420

[56] References Cited

U.S. PATENT DOCUMENTS

| 2,225,208 | 12/1940 | Crickmer | 285/104 |
| 2,473,046 | 6/1949 | Adams, Jr. | 285/104 |
| 3,078,108 | 2/1963 | Smith | 285/104 |
| 4,438,954 | 3/1984 | Hattori | 285/104 |
| 4,768,813 | 9/1988 | Timmons | 285/373 |
| 5,246,257 | 9/1993 | Kojima et al. | 285/373 |

FOREIGN PATENT DOCUMENTS

| 360946 | 4/1990 | European Pat. Off. | 285/373 |
| 703105 | 4/1931 | France | 285/373 |
| 3626289 | 10/1987 | Germany | 285/373 |
| 443375 | 2/1936 | United Kingdom | 285/373 |
| 2202915 | 10/1988 | United Kingdom | 285/373 |

*Primary Examiner*—Eric K. Nicholson
*Attorney, Agent, or Firm*—Edward Dreyfus, Esq.

[57] ABSTRACT

A threadless connector for cable pipes or electrical conduit that includes two half-couplings having tightening flanges along their lateral edges or faces. Female and male necks and beads extend along the cooperating lateral faces to form longitudinal seals when the half-couplings are clamped together. Internal radial grooves located near the outer parts of both ends of the half-couplings cooperate with split compression rings the outer surface of which compresses against the conic grooves and the inner edges bite into the connected pipe sections to form radial seals therewith. The half-couplings can be either two separate congruent parts or joined along one edge as desired.

8 Claims, 3 Drawing Sheets

THREADLESS CONNECTOR FOR ELECTRICAL CONDUITS

BACKGROUND

The present invention relates to the field of electrical assembly installations for pipe wirings and, more particularly, for connecting metal cable pipes or conduits for installation in buildings and other types of construction.

The technical problem solved by the present invention is a new pipe connector providing:

threadless connection of metal pipes or conduit sections;

radial assembly;

possibility of assembly in hard-to-reach places with the limited place for installation tools;

assembly simplicity;

reliable electric contacts between the connecting pipes;

reliable moisture and dust-proof seal at the junction.

The basic prior art design of known connectors is a cylindrical coupling with internal thread into which connected pipes are either screwed in from both sides or the coupling itself is preliminary fully screwed on one of the pipes and then the second pipe is screwed on to the other half of the connector. See O-Z Gidney Product Catalog 8700—Electrical Fittings and Enclosure 1987, Page 66, "ICC TYPE". The required presence of the thread on this prior art pipe junction greatly complicates the assembly and limits application of such connectors in electrical assembly installations.

A prior art improvement includes smooth, unthreaded connectors, for example, the coupling comprising a shaped shackle having openings for the connected pipes and threaded holes to receive coupling bolts, which when screwed, causes the shackle ends to engage the pipes and couple them together. See USSR Patent No. 1,350,728. In spite of technological simplicity of production, such coupling does not provide sufficient mechanical strength as well as moisture and dust prevention of the junction for most applications.

There are known further couplings for threadless pipes connection, for example, where the pipe coupling action is carried out with the help of lock screws. See the above mentioned Product Catalog, Page 81, "29" type and Page 97, "5000" type or Japan Published Patent Application No. 61-43929. Additionally, said Japanese Publication includes an elastic plate having a semi-ring form is installed in the coupling held to the pipe by the lock screw to create a closed or sealed connection. The main disadvantage of such standard connectors lies in the fact that it is practically impossible to provide good electric contact, moisture and dust impenetrability and assembly simplicity simultaneously because, on the one hand, it is necessary to have as small clearance between the coupling and the pipe as possible and on the other hand this clearance must be as big as possible, otherwise, in case of the slightest warp or axes shift of the connected pipes, it will be impossible to install them in the cylindrical coupling.

More complicated connector constructions are known comprising a cylindrical coupling with two-way external thread, two coupling nuts, and split sealing rings. See the above mentioned O-Z Catalog, page 80 "30" type; page 96 "6000S" and "6000RS" types. Connected pipes are inserted from both sides into the coupling whereupon the nuts, preliminary mounted on pipes, are screwed on it. When screwing, the nut holds down the sealing ring close to the pipe, providing good electric contact and high moisture impenetrability. The given connector provides also high mechanical strength to the joint. However, the characteristics of the axial assembly of this connector involve causes assembly difficulties in cases of axial warp of the pipes and in hard-to-reach places, particularly when one connector half is already on an installed pipe and a tightening tool is required to be used.

It should be mentioned that radial assembly is not used for the most simplest to make joints because the problem of the end packing is compounded by the problem of the lateral packing. To avoid such a problem, half-coupling joints have been used. See, for example Japan Published Patent Application No. 64-4404. The joint provides good mechanical strength and assembly simplicity but does not protect the joint from the environment.

Another prior art pipe connector comprises flanges in the form of conic disks fixed (usually welded) near the ends of the connected pipes and two half-couplings having tightened flanges along the lateral faces and an internal radial conical groove. See Orlov P. E. "Desdign base: Methodical catalog" Two volumes, volume #2 by Uchaev P.E. 3rd corrected publishing, Sect. "M" Mechanical engineering, 1988. Page 544 (prototype-page 210, picture-drawing 494- VI). During assembly, the surfaces of the radial groove of the tightened half-couplings act upon the conical surfaces of pipe flanges, thus tightening the pipes together. The connector also has a sealing ring installed between the tightened flanges of half-couplings which purportedly solves the problem of lateral packing. There is no serious problem with the end packing for this connector because conic flanges are installed on pipes permanently (not sectionally). The main disadvantage of this connector is the assembly complexity because conic flanges need to be welded on the device during assembly and with rather high precision.

SUMMARY OF EXEMPLARY EMBODIMENT OF PRESENT INVENTION

The principle of the present invention provides a connector comprising two half-couplings having tightening flanges along the lateral face and an internal radial conic groove and sealing ring. According to the invention, half-couplings are executed split (sectional) or form on their one lateral sides a permanent joint and additionally contain a second internal radial conic groove, cooperating neck and beads portions extend along the tightened lateral faces on the internal sides of half-couplings. In the assembled state of the connector, these necks and beads seat into one another.

In one example, split metallic rings are used as a sealing ring installed in the mentioned conic grooves. To improve moisture impenetrability, beads and necks on the lateral joined faces of half-couplings are formed in such a way that first, only one longitudinal neck or bead is executed on the half-coupling internal surface in the space between radial conic grooves, and second, when assembling, they seat into one another with tension.

Additionally, to simplify the reliable joint and assembly, half-couplings can be formed as incomplete semi-cylinders and at least in one of the half-couplings one or both lateral faces can be made convex. Also, at least one radial projection can be formed on the internal surface of the half-couplings from their middle part, which when assembling, will enable optimal positioning of the connected pipes ends.

The present invention provides a connector with technical characteristics and benefits mentioned above. These results are achieved due to the fact that:

1) instead of a complicated conic-flange joint, the pipes are held due to their close compression between half-couplings that is achieved by large forces created when tightening together the half-coupling flanges, particularly when making half-couplings in the form of incomplete cylinders to place the flanges under tension when fully seated;

2) the problem of lateral packing is solved by the special form of joined lateral faces of half-couplings particularly when making them in such a way that when assembling, the necks and beads fit into another with tension; in this case, if half-couplings are made split (sectioned) the same necks and beads keep the half-couplings from axially shifting;

3) metal split rings solve the problem of the end packing, in this case unlike the known packing, the rings are held down not due to the axial force of the coupling nut (see the above mentioned O-Z catalog page 80 and page 96) but due to the radial force resulting from the tightened flanges and radial groove of conic form on the internal surface of the half-couplings;

4) the construction provides both axial and radial assembly which greatly simplifies the assembly and installation especially in hard-to-reach places and when the place for tools is limited and when automatic alignment of the connected pipes is desired;

5) the construction enables the assembly process to be optimized.

Axial assembly is assisted when installing pipes in the connector when split half-couplings can be tightened before hand along one lateral side due to their shape as incomplete cylinders, leaving a rather large opening for inserting the pipe to be connected. Thereafter, half-coupling flanges are tightened with the help of a standard screwdriver or spanner tool (depending on bolt head shape). In addition, when lateral faces of the half-couplings are shaped convex, independent support of the connector is possible, first by installation on one pipe and then insertion of the other pipe into it for final clamping of the entire connector because the opening for bringing in the pipe into the open end of the connector remains large until the final tightening.

DRAWINGS

The embodiments according to the invention are illustrated by the following figures where:

DETAILED DESCRIPTION OF EMBODIMENTS ACCORDING TO THE PRESENT INVENTION

The connector according to the present invention can be implemented both in the form of the split joint of two half-couplings (FIG. 1) and permanent joint (FIG. 2) when half-couplings form a permanent joint or are integral along one of their edges along their lateral faces.

Figure 1:
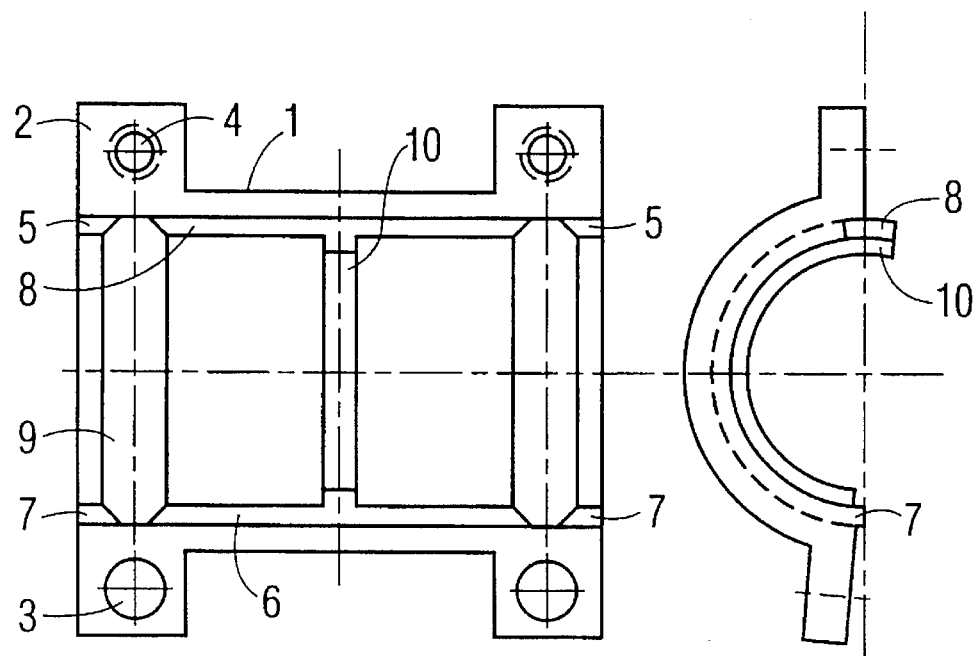
FIG. 1 is a side and end view of split connector half-coupling.

Referring to FIG. 1, half-coupling 1 has tightening flanges 2 defining locating holes 3 and threaded holes 4 for coupling bolts. Lateral necks or grooves 5, 6, and beads 7, 8 are formed on the lateral faces of half couplings. These grooves and beads fit into one another with tension when the two half couplings are clamped together. Conical grooves 9 are formed close to the ends of half-coupling 1. Projection 10, formed in the central part, serves as a limiter for insertion of pipes to be connected. The entire connector is implemented from the assembly of two such similar half-couplings along with the parts described below.

Figure 3:
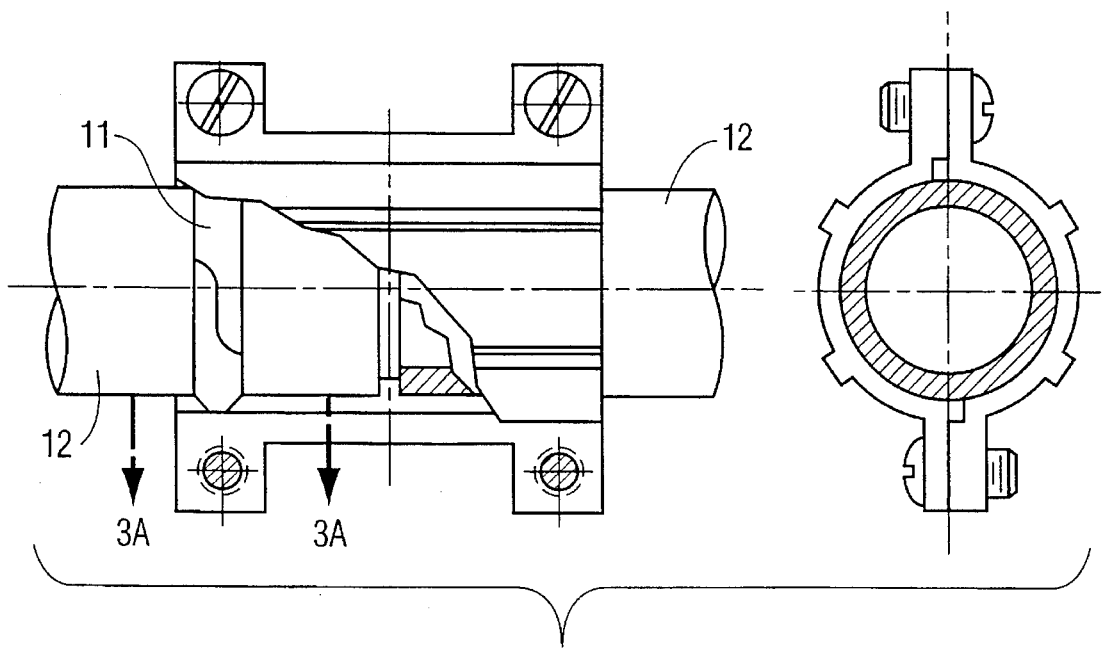
FIG. 3 is a partial cut-away side view and an end view of the connector of FIG. 1 in the assembled state.

Before the connector is assembled, split rings 11 (FIG. 3) are installed in respective conic grooves 9. The internal diameter of rings 11 in their free state, (not compressed) is greater than the diameter of the connected pipes 12. Except for Stop 10, the internal diameter of the connector, in free state, is greater than the diameter of the connected pipes 12 outer diameter. This arrangement of parts enables assembly in both the radial and axial directions, as desired.

Figure 3A:
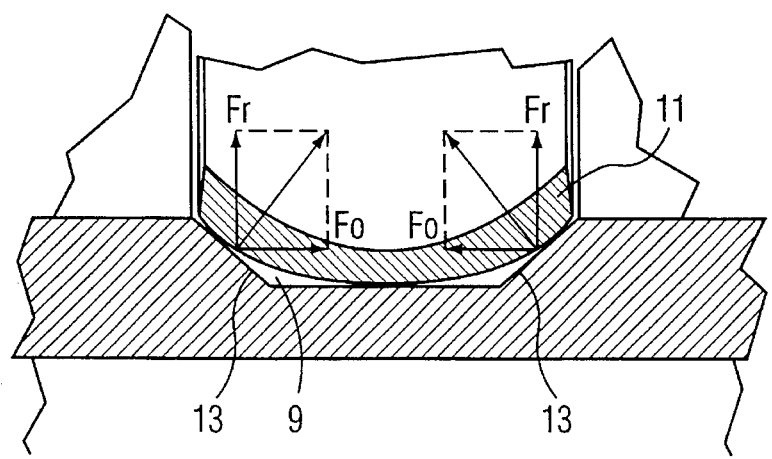
FIG. 3A is a sectional view take along line 3A—3A of FIG. 3 but without the conduit being shown.

The forces acting on the ring 11 are also shown in FIG. 3A. Conic surfaces 13 of the groove 9 acts when tightening half-coupling 1 on the ring 11 to compress the latter both in radial direction (forces Fr) and in axial direction (forces Fo). In this case, both tight clamping of the ring 11 to the surface of pipe 12 and compression of ring 11 to form a bite or cut (slit) in said pipe surface are provided. Accordingly, groove 9 maintains the ring 11 in place for clamping and formation of reliable packing or sealing. The locking or clamping forces of the ring 11 to the pipe 12 are such that the ring cuts into or penetrates the pipe's surface resulting in a good seal, pinpoint mechanical strength of the joint and good electric contact between connected pipes.

It should be mentioned that, unlike the known construction (eg, O-Z above mentioned catalog page 80 "30" type; page 96 "6000S" and "6000RS" types) where screwing on the coupling the nut acts on the sealing ring in the axial direction which compresses the ring between the coupling end and its own internal end surface, the connector according to the present invention compression of the ring 11 results from application of radial force on the coupling flanges.

Figure 4:
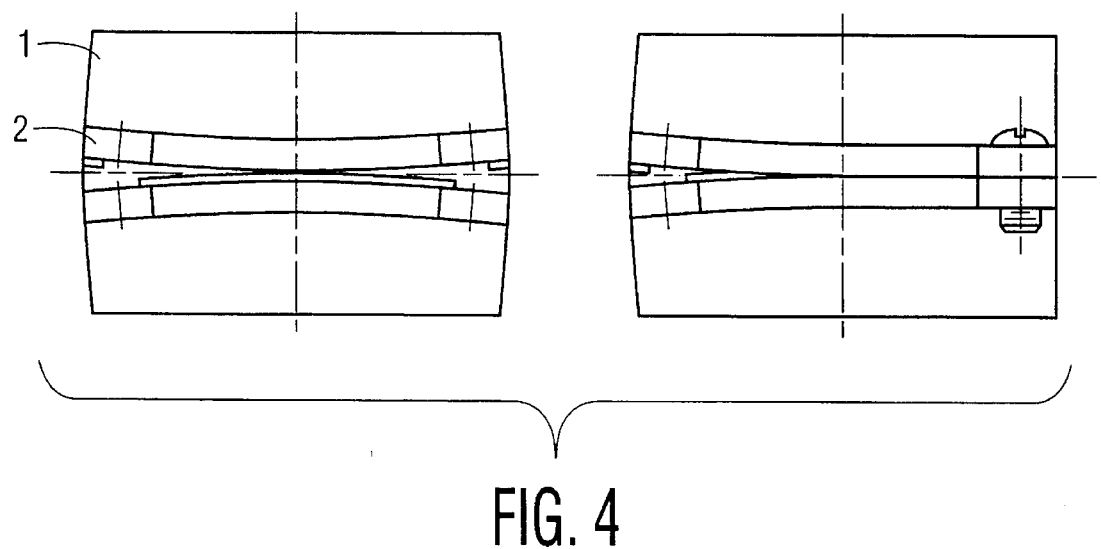
FIG. 4 is a plan view of an alternate connector with the convex lateral faces.

One of the features of the connector, according to the present invention, is to provide a rather large opening for bringing in the pipes that sufficiently simplify the installation effort. This feature can be emphasized by imparting a convex form to the connected faces of the half-couplings (FIG. 4). In this case, half-couplings can be made of flexible metal material and the connector is first installed on one of the connected pipes. In this way, the free opening for bringing in the other pipe remains rather large for insertion of the other pipe followed by tightening the free side of the connector. As the operation of the connector is based mainly on elastic properties of the material, it should be made, for example, of steel.

Figure 2:
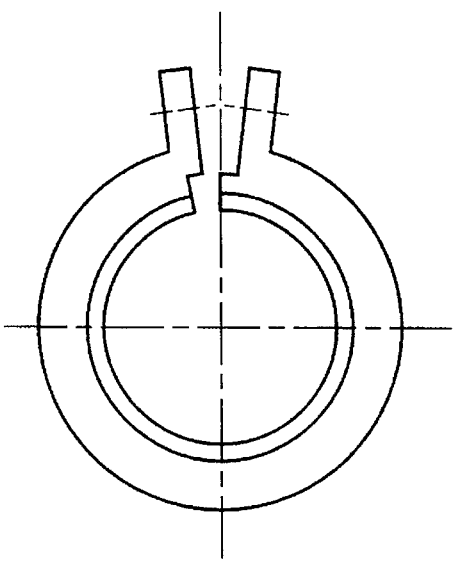
FIG. 2 is an end view of an alternate connector in which half-couplings are joined integral along two edges of the lateral faces.

It should be understood that internal face design of the embodiment of FIG. 2 is the same as that of the half-couplings and provides conic grooves 9, split rings 11 and necks 5, 6 and beads 7, 8 on the free edges only. Clamping installation for the connector of FIG. 4 is also the same except only two sets of flanges and two bolts need be screwed tight. It will be understood that the connector of FIG. 2 is preferred for axial installation.

The connector, according to the present invention (FIG. 5), was manufactured. Tests confirm its serviceability and achievement of the above mentioned technical result.

It will be understood that various modifications and improvements can be made to the embodiments herein disclosed without departing from the spirit and scope of the present invention.

We claim:

1. A pipe coupling for engaging and securing in axial alignment adjacent ends of two separate pipe sections, said coupling comprising:

an axially extending body defining an axial opening for receiving each adjacent end of the pipe sections, said body having at least first and second axially extending faces positioned laterally from said opening and being spaced from each other and moveable toward each other and each of said faces having first and second axial ends, said first face defining an axially extending bead member, said second face defining an axially extending groove member for receiving said bead member for partially sealing said opening, said body further defining at least a first radial groove having walls extending around and intersecting said opening, a first ring member retained in said radial groove being compressed against said walls when said first and second faces moved toward each other for partially sealing said axial opening, and first securing members fixed externally to said body for compressing said first axial ends of said first and second faces toward each other, second securing members fixed externally to said body for compressing said second axial ends of said first and second faces toward each other, and wherein said first face includes a convex portion located near the axial mid-length of said first face and extending toward said second face for contacting said second face for enabling full compression of said first axial ends on one pipe section while spreading open said second axial ends to receive the other pipe section prior to compression by said second securing members.

2. The coupling according to claim 1, wherein said ring includes at least one edge that extends into said opening for penetrating the surface of the pipe section when said first and second faces are compressed toward each other to partially seal said opening.

3. The coupling according to claim 1, wherein said body further defines at least a second radial groove having second walls extending around and intersecting said opening, and wherein said coupling further comprises a second ring member retained in said second radial groove being compressed against said second walls when said first and second faces are moved toward each other for partially sealing said axial opening, and wherein said first and second radial grooves are spaced from each other for radial alignment with opposite ones of the two pipe sections, and wherein said bead and groove members are located between said first and second radial grooves.

4. The coupling according to claim 1, wherein said body comprises first and second half couplings, said first half coupling defining said first face and defining a third axially extending face positioned laterally from said opening and radially from said first face, said second coupling defining said second face and defining a fourth axially extending face positioned laterally from said opening and radially from said second face, said first and second faces being spaced from each other and being moveable toward each other, said third and fourth faces being spaced from each other and being moveable toward each other, said third face defining an axially extending bead member, said fourth face defining an axially extending groove member for receiving said bead member of said third face for partially sealing said opening when said third and fourth face move toward each other, each of said third and fourth faces having third and fourth axial ends, third securing members fixed externally to said body for compressing said third axial ends of said third and fourth faces toward each other, fourth securing members fixed externally to said body for compressing said fourth axial ends of said third and fourth faces toward each other, and wherein said third face includes a portion extending toward said fourth face for enabling full compression of said third axial ends on said one pipe section while maintaining open said fourth axial ends to receive said other pipe section prior to compression by said fourth securing members.

5. The coupling according to claim 1, wherein said body comprises first and second half couplings, each said half coupling comprising an incomplete semi-cylinder prior to installation.

6. The coupling according to claim 1, wherein said body opening forms a complete cylinder when the body is fully installed.

7. The coupling according to claim 2, wherein said ring comprises a portion having two mutually facing parts spaced radially from each other prior to said first and second faces being driven toward each other, said parts being compressed together by said groove member when said first and second faces are moved toward each other.

8. A pipe coupling for engaging and securing in axial alignment adjacent ends of two separate pipe sections, said coupling comprising:

an axially extending body defining an axial opening for receiving each adjacent end of the pipe sections, said body having at least first and second axially extending faces positioned laterally from said opening and being spaced from each other and moveable toward each other, said first face defining an axially extending bead member, said second face defining an axially extending groove member for receiving said bead member for partially sealing said opening, said body further defining at least a first radial groove having walls extending around and intersecting said opening, a first ring member retained in said radial groove being compressed against said walls when said first and second faces moved toward each other for partially sealing said axial opening, and securing members fixed externally to said body for compressing said first and second faces toward each other, and wherein said body comprises first and second half couplings, said first half coupling defining said first face and defining a third axially extending face positioned laterally from said opening and radially from said first face, said second coupling defining said second face and defining a fourth axially extending face positioned laterally from said opening and radially from said second face, said first and second faces being spaced from each other and being moveable toward each other, said third and fourth faces being spaced from each other and being moveable toward each other, said third face defining an axially extending bead member, said fourth face defining an axially extending groove member for receiving said bead member of said third face for partially sealing said opening when said third and fourth face move toward each other, and wherein said first and second half couplings have first and second convex surfaces respectively, said first and second surfaces facing each other prior to installation, said securing members being positioned to compress one end of the body half coupling first and second convex surfaces together to engage one of the pipe sections while tending to spread open the other end of the body half coupling first and second convex surfaces, so that the other pipe section can be easily inserted into the other end of said body before said securing members compress said other ends of said first and second convex surfaces together to complete the installation.

* * * * *